(12) United States Patent
Handel et al.

(10) Patent No.: US 11,669,861 B2
(45) Date of Patent: Jun. 6, 2023

(54) SYSTEM FOR RESOURCE SERVICE PROVIDER

(71) Applicant: Deem, Inc., San Francisco, CA (US)

(72) Inventors: Sean Handel, Moss Beach, CA (US); Patrick Grady, San Francisco, CA (US); Mark Orttung, Menlo Park, CA (US); Dan Kikinis, Saratoga, CA (US)

(73) Assignee: Deem, Inc., San Francisco, CA (US)

( * ) Notice: Subject to any disclaimer, the term of this patent is extended or adjusted under 35 U.S.C. 154(b) by 0 days.

(21) Appl. No.: 17/942,660

(22) Filed: Sep. 12, 2022

(65) Prior Publication Data

US 2023/0005015 A1    Jan. 5, 2023

Related U.S. Application Data

(63) Continuation of application No. 16/276,213, filed on Feb. 14, 2019, now Pat. No. 11,443,342, which is a
(Continued)

(51) Int. Cl.
*G06Q 30/02*    (2023.01)
*G06F 16/2457*  (2019.01)
*G06Q 10/08*    (2023.01)
*G06Q 50/30*    (2012.01)
*G06Q 10/00*    (2023.01)
(Continued)

(52) U.S. Cl.
CPC ... *G06Q 30/0252* (2013.01); *G06F 16/24575* (2019.01); *G06Q 10/00* (2013.01); *G06Q 10/087* (2013.01); *G06Q 30/0207* (2013.01); *G06Q 30/0261* (2013.01); *G06Q 30/0264* (2013.01); *G06Q 50/30* (2013.01)

(58) Field of Classification Search
CPC .. G06Q 30/0252; G06Q 10/00; G06Q 10/087; G06Q 30/0207; G06Q 30/0261; G06Q 30/0264; G06Q 50/30; G06F 16/24575
USPC ........................................................ 705/14.5
See application file for complete search history.

(56) References Cited

PUBLICATIONS

Sabre, Sabre Airline Solutions Launches Breakthrough SabreSonic Inventory for Real-Time Airline Seat Inventory Management and Customer Based Dynamic Availability, 2004 (Year: 2004).*

* cited by examiner

*Primary Examiner* — Tarek Elchanti
(74) *Attorney, Agent, or Firm* — Alston & Bird LLP (57) ABSTRACT

In one embodiment, a system, is provided to take not just a person's time and location into consideration, but also has knowledge of and takes into account their availability, their preferences, their schedule, their purpose for being at their current location, and/or their next goal or stop. One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc. In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

20 Claims, 7 Drawing Sheets

Related U.S. Application Data continuation of application No. 14/834,277, filed on Aug. 24, 2015, now Pat. No. 10,217,131, which is a continuation of application No. 11/388,540, filed on Mar. 23, 2006, now Pat. No. 9,117,223, which is a continuation-in-part of application No. 11/321,769, filed on Dec. 28, 2005, now abandoned.

(51) Int. Cl.
*G06Q 30/0251* (2023.01)
*G06Q 30/0207* (2023.01)
*G06Q 10/087* (2023.01)

SYSTEM FOR RESOURCE SERVICE PROVIDER

CROSS-REFERENCE AND PRIORITY CLAIM TO RELATED APPLICATIONS

The present application is a continuation of U.S. patent application Ser. No. 16/276,213, filed Feb. 14, 2019, entitled "SYSTEM FOR RESOURCE SERVICE PROVIDER", which is a continuation of U.S. patent application Ser. No. 14/834,277, filed Aug. 24, 2015, entitled "SYSTEM FOR RESOURCE SERVICE PROVIDER", which is a continuation of U.S. patent application Ser. No. 11/388,540, filed Mar. 23, 2006, entitled "Method and system for resource planning for service provider", which is a continuation-in-part of U.S. patent application Ser. No. 11/321,769, entitled "Method and System for Prediction and Delivery of Time- and Context-Sensitive Services," filed Dec. 28, 2005, the entire disclosures of which are incorporated herein by references.

BACKGROUND OF THE INVENTION

Location-based systems for tracking and mapping the movements of a subject rely mainly on technologies such as global positioning system (GPS) technology, such as Locate911, GPS/911, NAVSTAR GPS, or other equivalent technologies. They can give the identity of a person, the time, and their location. But while some services work globally, without regard to network or location on Earth, others are restricted to a specific network and or specific coverage locations. Some services use such technology to provide, for example, interactive network-based driving instructions. Rather than offering a car-based satellite navigation system, such a service uses a phone, usually a cell phone, to send its GPS information periodically to a server, which then uses that information to send maps of the current location, such as a street or other locator, back to the phone. Thus a user may enter (into said device) a target location and the phone can then display and guide the user through a route to the target. Other systems may provide people with auxiliary services such as, for example, a selection of restaurants nearby.

SUMMARY

In one embodiment, method that can be performed on a system, is provided to take not just a person's time and location into consideration, but also has knowledge of and takes into account their availability, their preferences, their schedule, their purpose for being at their current location, and/or their next goal or stop (not just in terms of location but also in terms of activity). One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
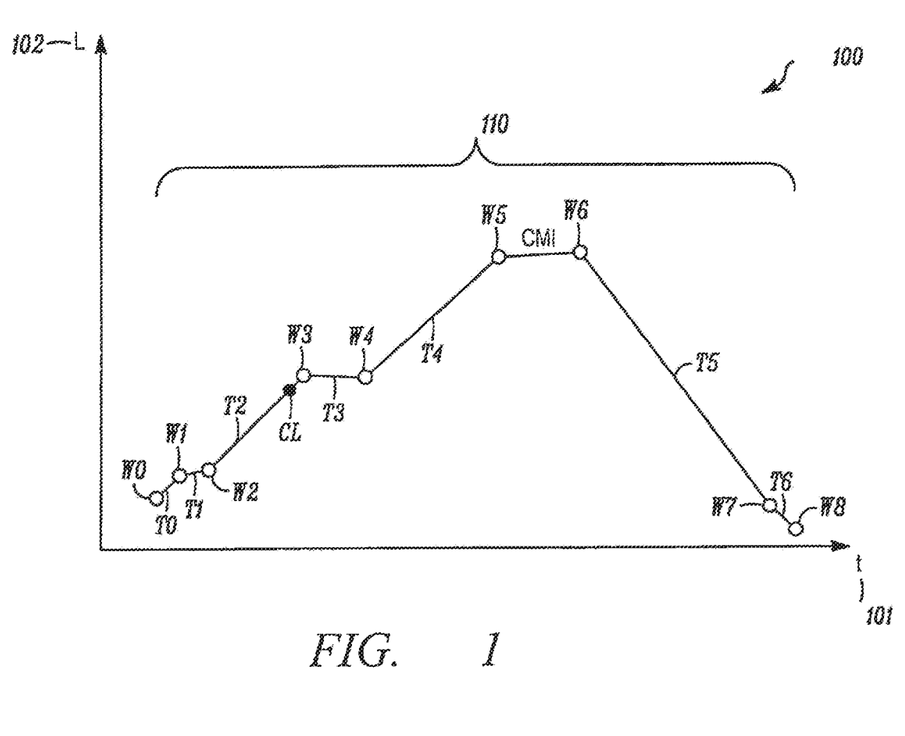
FIG. 1 presents an exemplary time-and-location graph, mapping the travels and activities of a person, in accordance with one embodiment.

FIG. 1 shows an exemplary time-and-location graph 100, mapping the travels and activities of a person. Locations are plotted along vertical axis l 102, and times are plotted along horizontal axis t 101. Way points W0-W8, which are locations where a person has some planned activity that relates to their business or their travel, and meeting segment M1 lie along travel segments T0-T6. For example, the travel segment T3 between points W3 and W4 could be when and where a traveler changes planes in O'Hare Airport in Chicago, moving between his arrival gate, which in this example is W3, and his departure gate, which in this example is W4. The traveler arrives on a plane whose flight is travel segment T2, and he must depart on another plane whose flight is travel segment T4. His location, which, in this example, is his current location CL, is on the arrival path into the airport, as indicated by the placement of CL on travel segment T2.

Figure 2:
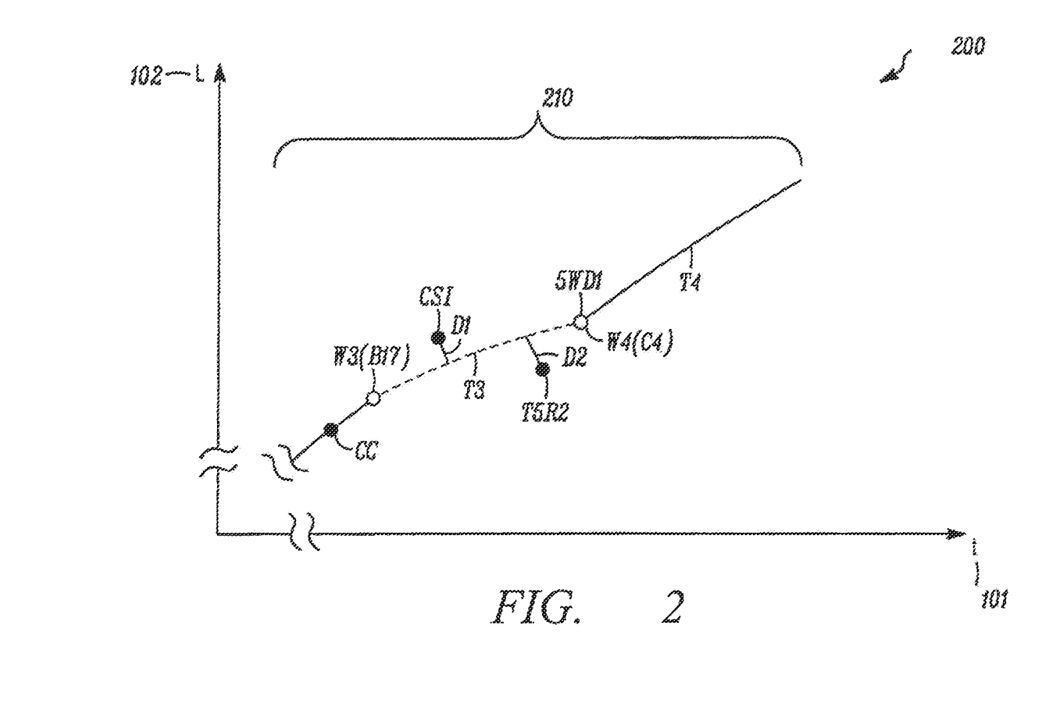
FIG. 2 presents a time-and-location graph that shows the plane-change portion of the trip, in accordance with one embodiment.

FIG. 2 is a time-and-location graph 200 that shows the plane-change portion of the trip mentioned as an example in the description of FIG. 1, above. Current location CL is shown in magnified graph section 210. Way point W3 could be, for example, gate B17, where the traveler arrives, and way point W4 could be gate C4, where he is scheduled to depart. Thus the traveler must walk, in this case, from W3 to W4, along travel segment T3. Along this segment lie a coffee shop CS1, for example, or a full-service restaurant FSR2, at certain distances D1 and D2 from point W3. With the predictive context-sensitive awareness system of this invention, the traveler's phone could tell him that he does not have food service on his next flight and could also tell him the location of restaurants CS1 and FSR2 in the path between gates, basing the selection of these two restaurants for his information on his past preferences. In addition, based on merchant agreements for priority listings, various food merchants in the airport may receive notification of the traveler's future planned and current activity, so in real time/dynamically, or in the future, these merchants could offer the traveler a discount coupon to attract him to their business, or could send him an online menu so he could, for example, view the menu and order food to be ready when he arrives, either for on-site consumption or to go for his next flight. Further, referring to his preferences and past behavior, the system may submit only certain of these offers to him.

Additionally, in one embodiment a real-time/dynamic link to the supplier's inventory system affects which offers are made by suppliers. For example, a café might have twice the expected inventory of chocolate chip cookies, which can't be sold beyond four hours from time of baking. Based on this inventory level, the supplier system would offer free chocolate chip cookies to passers by until the inventory level reaches the supplier's expected levels again, at which point the offers would stop.

Figure 3:
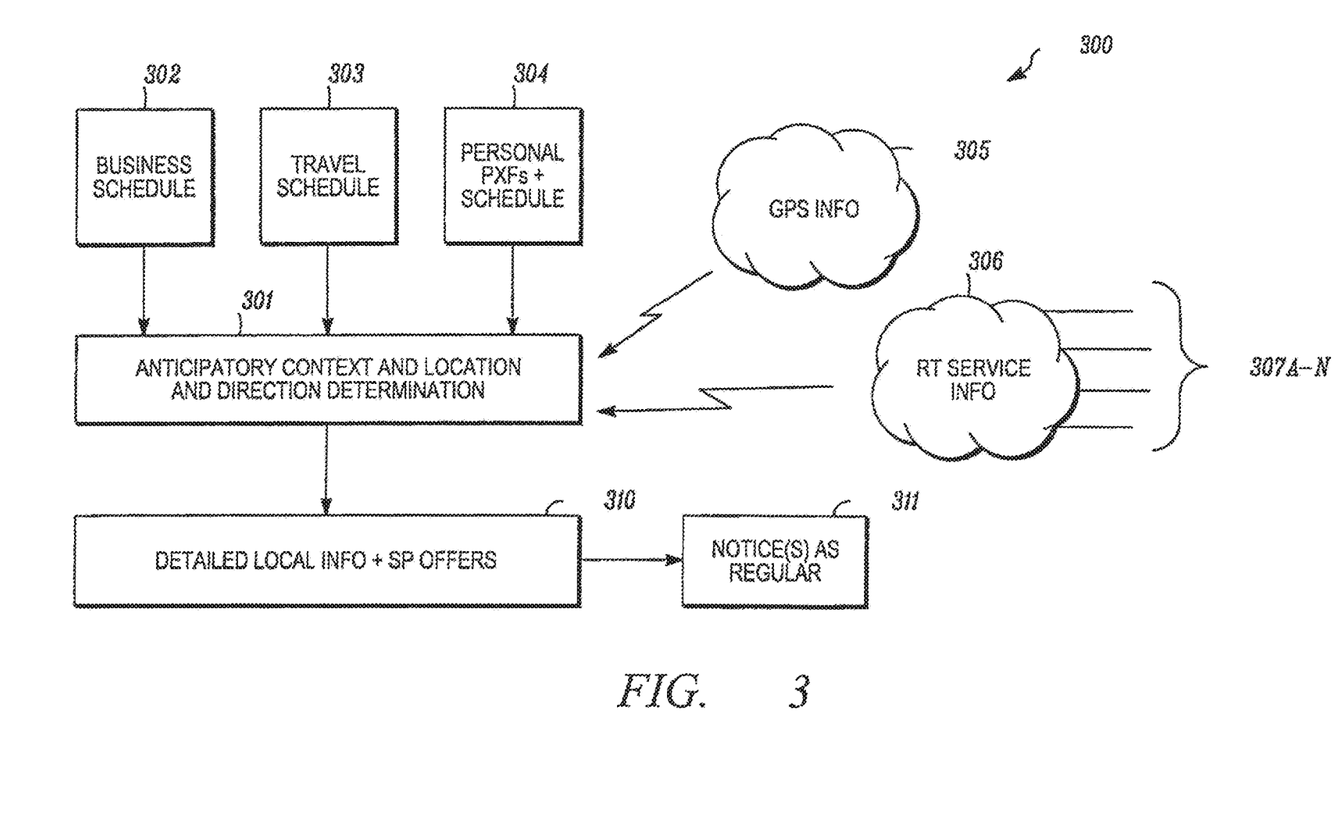
FIG. 3 shows an overview of the architecture of one embodiment of a system.

FIG. 3 shows an overview of the architecture of one embodiment of a system 300. The anticipatory context and location-sensitive and direction-determination system 301 is using information coming from many source, such as the business schedule 302, the travel schedule 303, and the personal preferences and schedule of the traveler 304. Information also comes from the GPS information from user's device 305 (this may be GPS or other equivalent location technology, herein generally referred to as GPS) and real-time service provider information 306, which may be provided by any of a large variety of service providers in real time through connections 307a-n. In other cases this information may be collected in another section of a service platform and provided directly from there. This information may trickle in based on travel schedules, or it may be returned based on requests specific to the travel schedule being examined. This supplier information would include information on the real-time status of inventory levels and the state of the supplier's yield management system. The information is then processed with detailed local information and service provider offers in section 310, and the results are processed and are sent as notices to the user or to other members of his business team, family, or other involved persons, or to service providers as required.

In one embodiment the individual service events that are booked for a user report relevant events it creates to a centralized system. In one embodiment, the structure for the events generated by services include any of multiple parameters, such as the date and time of the event start; the date and time of the event end; the location (address, airport, train station, etc.) where that event starts; the location (address, airport, train station, etc.) where that event ends; the type of travel between destinations, which may include, but is not limited to, such carriers as airplane, car, and train; the location of travel between destinations, which may include, for example, traveling between, at destination, or near destination; people who are sharing this event (for example, if a limo is booked with two passengers, then those two people would be named); availability of people involved in event; and options such as not available or available via such communication means as mobile phone, work phone, home phone, text messaging, email, or instant messenger.

In other embodiments, the events also include surrounding time periods affected by this reservation. For example, the fact that a traveler has a flight that is scheduled to depart at 4 p.m. means that he is likely to be traveling to the airport for some period of time before that flight departs and will be unavailable for certain things such as phone calls, email or marketing offers. However, if said traveler has a layover between flights, he may be available to receive offers for restaurants in the B concourse at O'Hare offering discounts to him over his mobile phone. In addition, the user should be able to set preferences for each service that indicate how he would like to be available during specific events. For example, the flight service may allow the user to indicate that during the layover period at an airport, he is available via SMS and email, but not by phone. One embodiment allows for a more detailed availability model controlled in part by the user. One embodiment also allows for a detailed analysis of the dependencies between services. For example, if a user changed his flight leaving from SFO, the system could derive from this event list that he probably also wants to change his airport parking service at SFO.

In one embodiment, if a travel line (time and/or place) is changed due to, for example, a late flight, changed plans, or early or late conclusion of business at a certain stop may include, but are not limited to, notification of affected parties, such as a limo service (to reschedule a pick-up time), family and/or friends, a hotel (to reschedule, cancel, or book reservations), a restaurant (also to reschedule, cancel, or book reservations); and making alternate arrangements, based on known preferences, such as booking a limo instead of a cab, booking an earlier or later flight, including seat reservations, arranging a car rental, presenting public transportation routes and schedules with information about getting via shuttle or train from the airport to the hotel, etc. For example, the system may let the traveler know whether a nearby hotel has early check-in available, thus letting the traveler decide whether to proceed to the hotel and take a shower, or shower at the airport lounge, or go to an offsite restaurant.

One embodiment also coordinates offers from businesses and suppliers, based on knowledge of a traveler's stops and route/path, such as special deals, based on known preferences and past spending from businesses more or less along the traveler's path. Suppliers may send a movie, documents, restaurant menu, etc., for the next flight segment, to pick up at the airport, waiting at the gate, or, in the case of digital items, even directly to user's devices such as a mobile phone or personal digital assistant (PDA). For example, a traveler may order a movie or other program in flight, so it can be downloaded and ready when the plane lands, waiting on a DVD or ready for transfer to a memory stick. Further, one embodiment sends the traveler messages with information about the airport, such as whether passing through a security checkpoint is required to get to a certain merchant or for changing buildings, etc., or about the availability of services in and out of the airport security zone (i.e., for a quick meeting with local non-traveler, etc.).

With predictive knowledge of future traffic near their establishment at a given time period, suppliers can prepare in various ways, such as, for example, by ordering appropriate amounts of perishable food, by making special offers based on light traffic (deeper discounts) or heavy traffic (discounts on food to go, to reduce crowding on site). Also, the further a merchant is off the route of a traveler, the more of an incentive the merchant may offer to the traveler to go to his establishment, in addition to a low traffic discount.

One embodiment schedules variable intervals of GPS checking, such as every 15 seconds, 30 seconds, 5 minutes, 1 km, etc. Further, the checking interval may depend on the traveler's location and available services. For example, in an airport, precise location is important because of the many services available in the area, while the location of a car traveling across the Mojave Desert is less critical because there are no services for miles.

The installation of microcells on airplanes facilitates cell phone GPS and predictive services as described herein. Further, one embodiment use subsets of microcells (IP addresses), to ascertain the traveler's location very specifically; for example, on a particular flight, or at some other specific location. Thus by checking the traveler's ID and having knowledge of his plans and schedule, one embodiment ensures that he is in the right place at the right time, e.g., at the right gate for the correct flight. Alternative embodiments may apply to other situations besides airplanes, including but not limited to cars, busses, boats, trains etc.

As the system detects changes or deviations from the predicted itinerary, the offers of service are adjusted accordingly, in one embodiment. For example, if a traveler's flight is cancelled and the traveler is rebooked on a flight early the next morning, the system could offer bookings at nearby hotels.

One embodiment includes countermeasures to prevent unauthorized knowledge of the user's ID, for security purposes.

In one embodiment payment options, such as the use of credit cards such as American Express, VISA, Master Card, etc., and payment services such as PayPal, because they are accepted universally, even by small businesses. Thus, codes for discounts and promotions delivered to the user can be applied to credit card charges.

Figure 4:
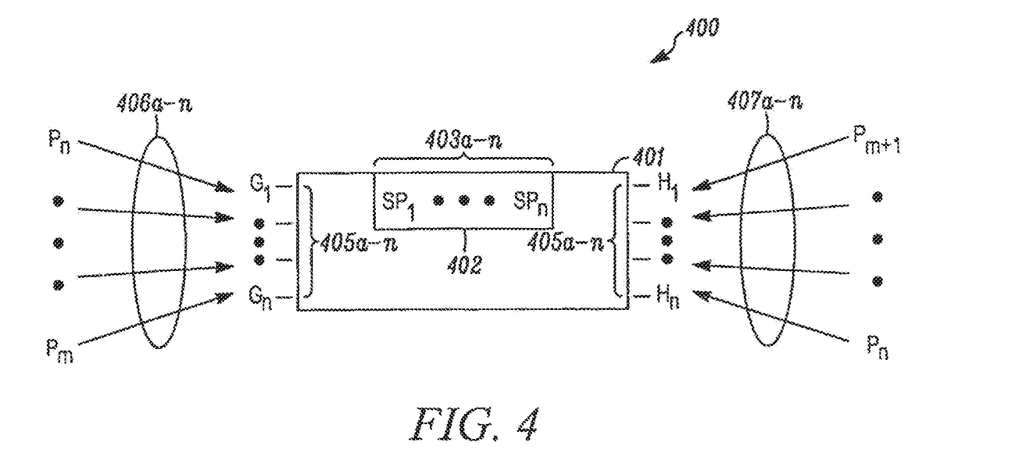
FIG. 4 illustrates an example travel environment.

FIG. 4 shows an example travel environment 400. It is clear that this travel environment is only exemplary and other kinds of environments are also applicable, including those examples given above, but for purposes of clarity and simplicity the focus shall be on this example environment. Terminal 401 is a typical commercial airline terminal, with two sets of gates G1-Gn 404*a-n* and H1-Hn 405*a-n*. There is also food court 402 with a concentration of service providers SP1-SPn 403*a-n*. Planes P1-Pn come from both sides, as indicated by arrows 406*a-n* and 407*a-n*. In such an environment, most airline flights are typically to or from a hub terminal, wherein travelers arrive and then leave again on connecting flights within a very short period of time.

Figure 5:
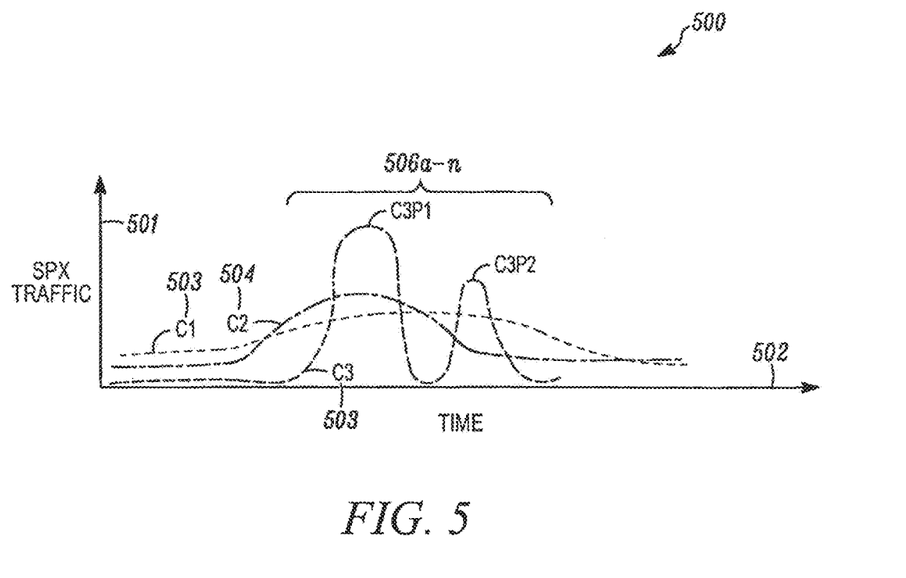
FIG. 5 illustrates a graph of traffic variations at service provider.

FIG. 5 shows a graph 500 of traffic variations at service provider SPx. The traffic quantity is shown on the vertical axis 501 and the time range is shown on the horizontal axis 502. Three example traffic curves are shown: curve C1 503, curve C2 504, and curve C3 505. Each curve has a different peak, or peaks, in the peak area 506*a-n*. For example, curve C1 has a flat spread, in the case that the arrival and departure of planes is spread over a wider range of time, due perhaps to intentional scheduling and also to early and late arrival of some planes; while curve C2 shows a medium peak, with tighter scheduling but also with a few flights being delayed and others being early, resulting in a more condensed peak traffic; and curve C3, due to, for example, schedule changes or weather-related problems in some part of the country, has two very sharp peaks C3P1 and C3P2. Depending on various conditions, such as scheduling and weather, as well as the amount and availability of food on the airplanes, the rate of conversion of offers tendered to travelers for goods and services at the terminal into sales may change, because people, if given a choice between having a snack and catching the next flight, will normally opt for catching the next flight. Having an understanding of the rate of conversion and its relation to traffic and weather patterns allows service providers to make more accurate predictions about various items, including but not limited to, conversion rates, offer types, offer upgrades, traffic etc.

Figure 6:
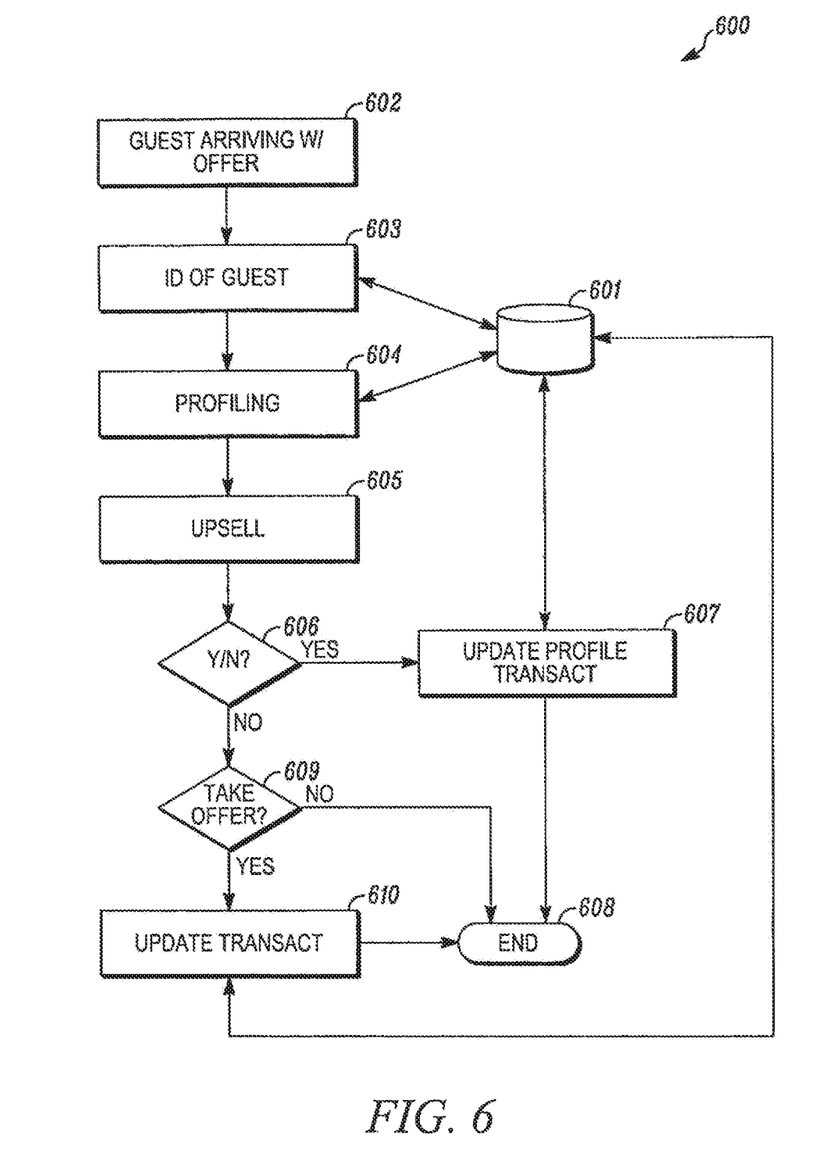
FIG. 6 provides a diagram of a process flow that could be used to analyze the conversions, in accordance with one embodiment.

FIG. 6 is a diagram of a process flow 600 that could be used to analyze the conversions. In process 602, a guest arrives at the service provider with an offer (typically, for food or other merchandise, or for a service). In process 603, a guest's ID is compared to information stored in database 601, which could be a local database, or part of a larger remote database, or two synchronized databases, or some combination of the these. In process 604 the profile information about the registered guest (i.e., traveler) is extracted from database 601, then used to update the profile. In particular, You download the profile to do what ever you do, then you may want to update what it is that you have done (e.g. a new offer), and possibly what the customers reaction to that offer was etc. In process 605, an up-sell (upgrade of the offer) may be offered to the guest. At process 606, the process branches. If the guest accepts (YES), the process moves to process 607, where the transaction takes place and the guest profile is updated in database 601, and then to process 608, where the process ends. If, in process 606, the guest does not accept the up-sell (NO), the process moves to process 609, where it again branches. If the guest accepts the original offer (YES), in process 610 the transaction takes place, the guest profile is updated (in some cases, the supplier database may be updated as well) in database 601, and the process moves to process 608, where it ends. If the guest does not accept the original offer (NO), the process ends at process 608.

Additional information, including but not limited to, conversion rates by flight, day of the week, season, weather, flight size, flight utilization, etc., may be collected by individual service providers and then pulled together for further analysis and refined prediction models, allowing more targeted offers. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

Figure 7:
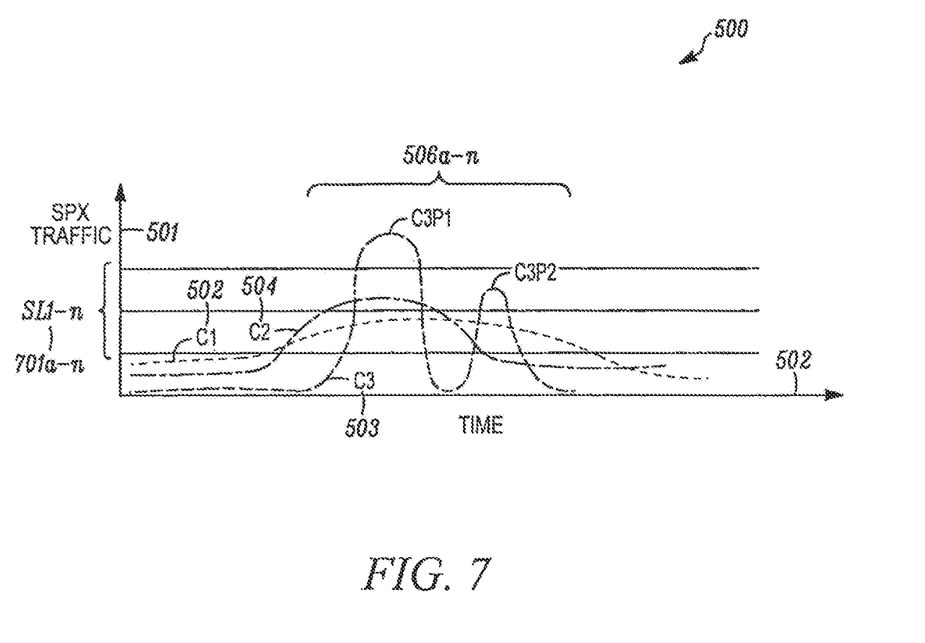
FIG. 7 illustrates a graph of traffic variations at service provider.

FIG. 7 shows a traffic graph with many of the same elements as FIG. 5 (see description, above). What has been added are horizontal lines indicating staffing levels SL1-n 701*a-n*. Thus when traffic peaks to the next line SLn, a higher staffing level would be required. Hence calculations must be made to forecast staffing levels some time ahead of the forecasted peak traffic, because people need notice to come to a work place. In a similar manner, forecasted food requirements must be calculated; for example, how many rolls need to be prepared and baked so there are freshly baked rolls when customers arrive at peak traffic times, etc.

Figure 8:
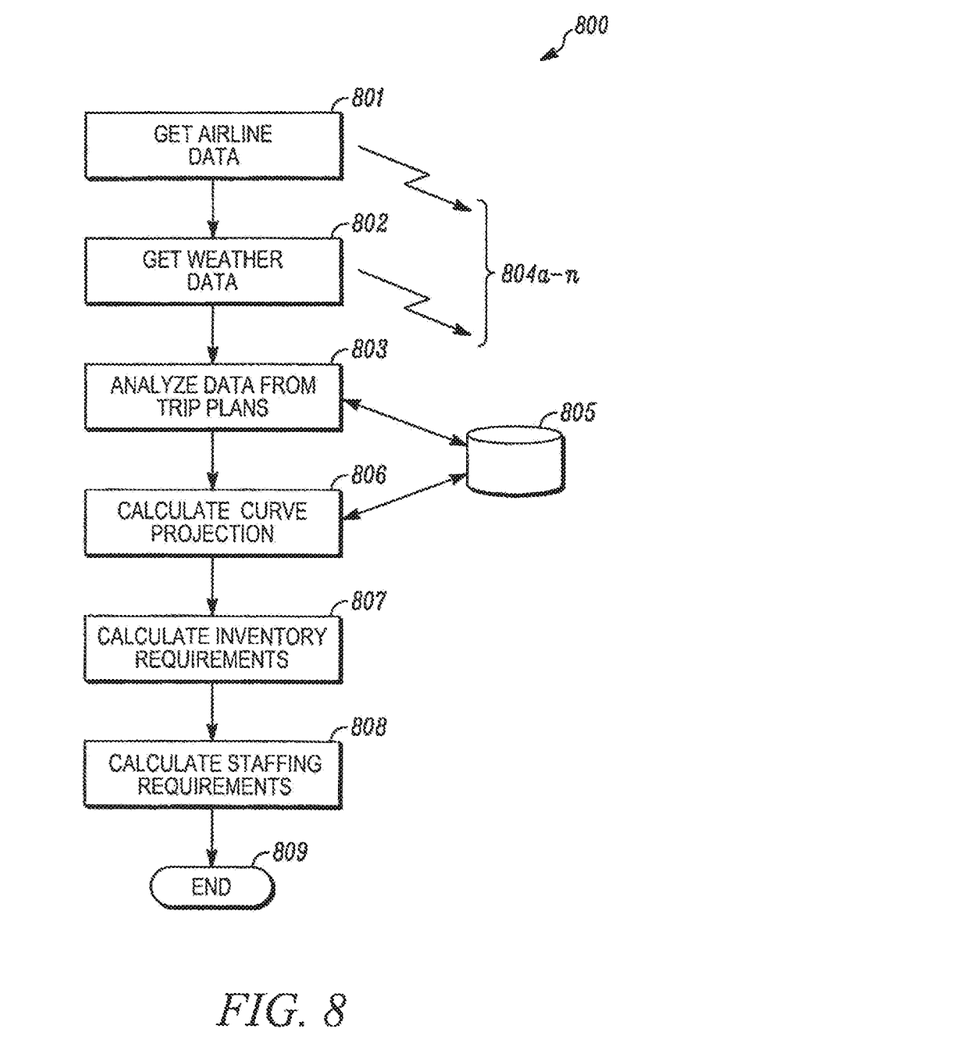
FIG. 8 provides a diagram of a process for calculations in support of forecasting, in accordance with one embodiment.

FIG. 8 is a diagram of a process flow 800 for calculations required for the types of forecasting discussed above. In step 801 the system obtains airline data, such as arrival and departure times, both actual (real-time) information and statistical models, as well as usage of the airplane and the airplane model, allowing the system to estimate the number of people expected at a certain time. The data is obtained via communication lines 804a-n, which may connect to a local or remote database in the system, or to both, or directly to a service provider. The weather data is collected in a similar manner in step 802, including, but not limited to, weather data from each flight's point of origin and weather data at the current airport location, because weather experienced at the beginning, during, and end of the flight may impact how travelers feel; whether they are more or less thirsty and/or hungry. Cold and rainy weather may promote the use of warm "comfort foods" while hot and dry weather promotes lighter foods and cold drinks, smoothies etc. This may also be modified by where travelers go to or come from, as the expectation of weather at the end of a trip, or just experienced weather a short while ago may impact how travelers feel about what food they desire. Large statistical gathering, preferably by demographics as well, may allow to cull meaningful data allowing to make better predictions, and hence reduce potential waste. In step 803, data is analyzed from known members, typically the registered travelers using the service (but in some cases, that may include planes, or groups of travelers including non-registered ones etc.) that have a well known track record. This information of these "well-known" or "bell weather" travelers can then be extrapolated, particularly in cases of insufficient statistical data for a current event, using also correlation to other information, including, but not limited to, historic data on weather, plane timeliness, plane capacity and usage, etc., some of which may be also stored in DB 805. All this information is then used in step 806 to calculate forecasted curves of required resources (inventory and man power). The system may not calculate just one curve, but multiple curves; for example, one each for multiple types of inventory, one for staffing level, and one each for other similar resources required by the service provider. In step 807 the actual requirements for each inventory item are calculated, with quantities given in ordering lots; for example, the rolls would be calculated by the tray, or fresh fruit would be calculated by the case, etc. In step 808, also according to the curves, the staffing level is likewise calculated, so that if necessary additional workers may be called in as auxiliary staff (not shown). In step 809, the process ends.

It is clear that many modifications and variations of this embodiment may be made by one skilled in the art without departing from the spirit of the novel art of this disclosure. Additional information, including but not limited to, resource requirements by flight, day of the week, season, weather, flight size, flight utilization, etc., may be collected by individual service providers and then pulled together for further analysis and refined prediction models, allowing more targeted resource predictions. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive).

Alternatively, the logic to perform the processes as discussed above could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

What is claimed is:

1. A computer implemented method comprising:
   obtaining airline data, wherein the airline data comprises (1) arrival and departure times for airline flights scheduled to arrive at a destination, 92) capacity of the airline flights, and/or (3) type of airplane to be used in the airline flights scheduled to arrive at the destination;
   generating an estimate of a quantity of travelers to arrive at the destination via air travel at designated time periods based at least in part on the obtained airline data;
   obtaining data related to a plurality of air travel itineraries previously booked by a plurality of the travelers, the air travel itinerary-related data comprising anticipatory locations determined based on GPS information;
   linking to a real-time inventory system associated with services or products;
   selecting the services or products to be offered to a plurality of the travelers as a plurality of offerings, wherein the services or products are selected based at least in part on (1) the air travel itinerary-related data and (2) a status on real-time inventory levels via the linked real-time inventory system;
   identifying a quantity of services or products needed to support the offerings; and
   forecasting the quantity of services or products based on extrapolation of historic data and the identified quantity of services or products needed to support the offerings;
   wherein the method steps are performed by a computer system.

2. The method of claim 1, wherein the historic data used for the extrapolation includes one or more of plane timeliness, plane capacity, and plane usage.

3. The method of claim 1, wherein the air travel itinerary-related data further comprises weather data for the destination.

4. The method of claim 3, wherein the air travel itinerary-related data further comprises weather data related to weather experienced or forecasted to be experienced by a set of the travelers during a traveling to the destination.

5. The method of claim 1, wherein the identifying comprises identifying the quantity of services or products needed to support the offerings based at least in part on (1) the estimate of the quantity of travelers and (2) the selected services or products.

6. The method of claim 1, further comprising:
   obtaining a profile of one or more of the travelers to arrive at the destination, individual profiles identifying at least one of preferred services or preferred products of a traveler, or a history of purchased services or products of a traveler.

7. The method of claim 6, wherein the selecting comprises selecting services or products for the offerings based at least in part on the obtained profiles.

8. The method of claim 7, further comprising:
performing the selecting and the identifying for multiple separate time periods.

9. The method of claim 8, wherein the identified quantity of services or products comprises an inventory of products.

10. The method of claim 1, further comprising:
before providing a second offer to a traveler, presenting a first offer to the traveler representing an attempt to up-sell, the first offer an upgrade of the second offer.

11. A non-transitory tangible machine-readable medium having stored thereon a set of instructions, which when executed perform processes comprising:
obtaining airline data, wherein the airline data comprises (1) arrival and departure times for airline flights scheduled to arrive at a destination, (2) capacity of the airline flights, and/or (3) type of airplane to be used in the airline flights scheduled to arrive at the destination;
generating an estimate of a quantity of travelers to arrive at the destination via air travel at designated time periods based at least in part on the obtained airline data;
obtaining data related to a plurality of air travel itineraries previously booked by a plurality of the travelers, the air travel itinerary-related data comprising anticipatory locations determined based on GPS information;
linking to a real-time inventory system associated with services or products;
selecting services or products to be offered to the travelers, the services or products to be offered to a plurality of the travelers as a plurality of offerings, wherein the services or products are selected based at least in part on (1) the air travel itinerary-related data and (2) a status on real-time inventory levels via the linked real-time inventory system;
identifying a quantity of services or products needed to support the offerings; and
forecasting the quantity of services or products based on extrapolation of historic data and the identified quantity of services or products needed to support the offerings.

12. The machine-readable medium of claim 11, wherein the air travel itinerary-related data further comprises weather data for the destination.

13. The machine-readable medium of claim 11, wherein the historic data used for the extrapolation includes one or more of plane timeliness, plane capacity, and plane usage.

14. The machine-readable medium of claim 13, wherein the processes performed in response to execution of the instructions further comprise:
before providing a second offer to a traveler, presenting a first offer to the traveler representing an attempt to up-sell, the first offer an upgrade of the second offer.

15. The machine-readable medium of claim 11, wherein the obtained airline data comprises the arrival and departure times for the airline flights scheduled to arrive at the destination, the capacity of the airline flights, and the type of airplane to be used in the airline flights scheduled to arrive at the destination.

16. A computer system comprising:
at least one processor; and
a memory in communication with the at least one processor, the memory storing instructions that, when executed by the at least one processor, cause the at least one processor to:
obtain airline data, wherein the airline data comprises (1) arrival and departure times for airline flights scheduled to arrive at a destination, (2) capacity of the airline flights, and/or (3) type of airplane to be used in the airline flights scheduled to arrive at the destination;
generate an estimate of a quantity of travelers to arrive at the destination via air travel at designated time periods based at least in part on the obtained airline data;
obtain data related to a plurality of air travel itineraries previously booked by a plurality of the travelers, the air travel itinerary-related data comprising anticipatory locations determined based on GPS information;
link to a real-time inventory system associated with services or products;
select the services or products to be offered to the travelers, the services or products to be offered to a plurality of the travelers as a plurality of offerings, wherein the services or products are selected based at least in part on (1) the air travel itinerary-related data and (2) a status on real-time inventory levels via the linked real-time inventory system;
identify a quantity of services or products needed to support the offerings; and
forecast the quantity of services or products based on extrapolation of historic data and the identified quantity of services or products needed to support the offerings.

17. The computer system of claim 16, wherein the air travel itinerary-related data further comprises weather data for the destination.

18. The computer system of claim 17, wherein the instructions, when executed by the at least one processor, further cause the at least one processor to provide a second offer to a traveler, presenting a first offer to the traveler representing an attempt to up-sell, the first offer an upgrade of the second offer.

19. The computer system of claim 17, wherein the historic data used for the extrapolation includes one or more of plane timeliness, plane capacity, and plane usage.

20. The computer system of claim 16, wherein the obtained airline data comprises the arrival and departure times for the airline flights scheduled to arrive at the destination, the capacity of the airline flights, and the type of airplane to be used in the airline flights scheduled to arrive at the destination.

* * * * *

UNITED STATES PATENT AND TRADEMARK OFFICE
CERTIFICATE OF CORRECTION

PATENT NO. : 11,669,861 B2
APPLICATION NO. : 17/942660
DATED : June 6, 2023
INVENTOR(S) : Sean Handel et al.

It is certified that error appears in the above-identified patent and that said Letters Patent is hereby corrected as shown below:

In the Claims

In Column 8, Line 21, Claim 1, delete "92)" and insert -- (2) --, therefor.

Signed and Sealed this
Twelfth Day of December, 2023

Katherine Kelly Vidal
*Director of the United States Patent and Trademark Office*